United States Patent
Langlois et al.

(10) Patent No.: US 7,379,254 B2
(45) Date of Patent: May 27, 2008

(54) MIXED FREQUENCY AMPLITUDE-BASED SERVO PATTERN

(75) Inventors: Denis J. Langlois, River Falls, WI (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 267 days.

(21) Appl. No.: 11/171,958

(22) Filed: Jun. 29, 2005

(65) Prior Publication Data

US 2007/0002487 A1    Jan. 4, 2007

(51) Int. Cl.
*G11B 5/584*    (2006.01)

(52) U.S. Cl. .................... 360/48; 360/77.12

(58) Field of Classification Search ............. None
See application file for complete search history.

(56) References Cited

U.S. PATENT DOCUMENTS

| | | | |
|---|---|---|---|
| 5,689,384 A | 11/1997 | Albrecht et al. | |
| 5,898,533 A | 4/1999 | Mantey et al. | |
| 6,021,013 A | 2/2000 | Albrecht et al. | |
| 6,023,385 A | 2/2000 | Gillingham et al. | |
| 6,025,970 A * | 2/2000 | Cheung | 360/77.08 |
| 6,134,070 A | 10/2000 | Tran et al. | |
| 6,241,674 B1 | 6/2001 | Phillips et al. | |
| 6,271,786 B1 | 8/2001 | Huff et al. | |
| 6,312,384 B1 | 11/2001 | Chiao | |
| 6,363,107 B1 | 3/2002 | Scott | |
| 6,381,261 B1 | 4/2002 | Nagazumi | |
| 6,385,268 B1 | 5/2002 | Fleming et al. | |
| 6,400,754 B2 | 6/2002 | Fleming et al. | |
| 6,462,904 B1 | 10/2002 | Albrecht et al. | |
| 6,735,039 B1 * | 5/2004 | Molstad | 360/77.12 |
| 6,768,606 B2 * | 7/2004 | Helms | 360/77.01 |
| 6,952,317 B2 | 10/2005 | Molstad et al. | |
| 2001/0053174 A1 | 12/2001 | Fleming et al. | |
| 2002/0093640 A1 | 7/2002 | Watanabe et al. | |
| 2005/0099713 A1 | 5/2005 | Molstad et al. | |
| 2005/0099714 A1 | 5/2005 | Yip et al. | |
| 2005/0099715 A1 | 5/2005 | Yip et al. | |

OTHER PUBLICATIONS

"Pulse Compression Recording," Dent III et al., *IEEE Transaction on Magnetics*, vol. MAG-12, No. 6, Nov. 1976, pp. 743-745.

* cited by examiner

*Primary Examiner*—Andrea Wellington
*Assistant Examiner*—Varsha A Kapadia
(74) *Attorney, Agent, or Firm*—Eric D. Levinson

(57) ABSTRACT

The invention is directed to a servo frame that includes servo windows written with different frequencies to provide redundant positioning information. The servo frame includes a set of first servo windows recorded at a first frequency and a set of second servo windows recorded at a second frequency arranged in a checkerboard-like pattern. The different frequencies of the servo windows allow the servo frame to achieve improved positioning information redundancy. A servo track may include a plurality of the servo frames described herein to accurately position data read/write heads adjacent corresponding data tracks. The redundancy built into each of the servo frames substantially minimizes errors in the positioning information.

16 Claims, 9 Drawing Sheets

MIXED FREQUENCY AMPLITUDE-BASED SERVO PATTERN

TECHNICAL FIELD

The invention relates to data storage media and, more particularly, magnetic storage media recorded with amplitude-based servo patterns.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks in a data band. Optical media, holographic media, and other media formats can also make use of data tracks.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic media include a plurality of servo bands, with data tracks being located between the servo bands.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, one or more data tracks can be located on the medium according to the data track's known displacement from the servo track. The servo controller receives detected servo signals from the servo heads, and generates position error signals, which are used to adjust positioning of a read/write head relative to the data tracks.

Amplitude-based servo patterns refer to servo patterns in which detection of the servo signal amplitude enables identification of head positioning relative to the medium. Amplitude-based servo patterns typically make use of amplitude-based servo windows which can be recorded or erased windows where a signal has been recorded or erased from the medium. As the head passes relative to the medium, signal amplitudes of detected servo signals can be used to determine whether the head is positioned correctly relative to a track on the medium. Amplitude-based servo patterns are commonly implemented in magnetic tape media, but may also be useful in other media.

SUMMARY

In general, the invention is directed to magnetic data storage media that includes a servo frame having servo windows written with different frequencies to provide redundant positioning information. The servo frame includes a set of first servo windows recorded at a first frequency and a set of second servo windows recorded at a second frequency. The sets of first and second servo windows are arranged in a checkerboard-like pattern. The different frequency windows allow the servo frame to achieve positioning information redundancy without extending a servo frame length or a servo sampling period. A servo track may include a plurality of the servo frames described herein to accurately position data read/write heads adjacent corresponding data tracks. The redundancy built into each of the servo frames substantially minimizes errors in the positioning information.

For example, a servo read head detects a mixed frequency servo signal when passing adjacent a servo frame patterned as described herein. Filters tuned to the first frequency and the second frequency generate a first frequency servo signal and a second frequency servo signal, respectively, from the mixed frequency servo signal. A first position error signal (PES) is calculated from the first frequency servo signal, and a second PES is calculated from the second frequency servo signal. An overall PES may be calculated by averaging the first PES and the second PES. When the mixed frequency servo signal is constant, both the first PES and the second PES adjust positioning of a read/write head in the same direction. In the case where the mixed frequency servo signal includes a signal dropout, the first PES and the second PES diverge such that the dropout does not affect the average PES. In this way, the servo pattern described herein increases positioning accuracy of a data read/write head relative to a corresponding data track.

In one embodiment, the invention is directed to a data storage medium comprising a servo track and one or more data tracks. The servo track comprises a plurality of servo frames that include a set of first servo windows recorded at a first frequency and a set of second servo windows recorded at a second frequency. The first servo windows and the second servo windows are arranged in a checkerboard-like pattern within the servo frame.

In another embodiment, the invention is directed to a method of reading a servo track, the servo track comprising a plurality of servo frames that include a set of first servo windows recorded at a first frequency and a set of second servo windows recorded at a second frequency, wherein the first and second servo windows are arranged in a checkerboard-like pattern. The method comprises detecting a mixed frequency servo signal, filtering the first frequency from the mixed frequency servo signal to generate a first frequency servo signal, and filtering the second frequency from the mixed frequency servo signal to generate a second frequency servo signal. A position error signal is then calculated based on the first frequency servo signal and the second frequency servo signal.

In another embodiment, the invention is directed to a system comprising a servo read head positioned to read a servo track of a data storage medium, the servo track comprising a plurality of servo frames that include a set of first servo windows recorded at a first frequency and a set of second servo windows recorded at a second frequency. The first and second servo windows may be arranged in a checkerboard-like pattern. The servo read head detects a mixed frequency servo signal from the servo track. The system also comprises a servo controller coupled to the servo read head. The servo controller filters the first frequency from the mixed frequency servo signal to generate a first frequency servo signal, filters the second frequency from the mixed frequency servo signal to generate a second frequency servo signal, and calculates a position error signal based on the first frequency servo signal and the second frequency servo signal.

The invention may be capable of providing one or more advantages. For example, the different frequency servo windows minimize error by providing improved redundancy of PES values. The servo pattern of the invention also generates a full amplitude mixed frequency servo signal that substantially improves the signal-to-noise ratio (SNR). Furthermore, a single or double bump servo write head with adjacent writer gaps may be used to write the simple checkerboard-like pattern of the servo frames. Since the servo pattern does not require a complex servo write head configuration, the servo pattern may be written by a tape drive, and in this case, the servo recording does not require a more complex servo writer.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
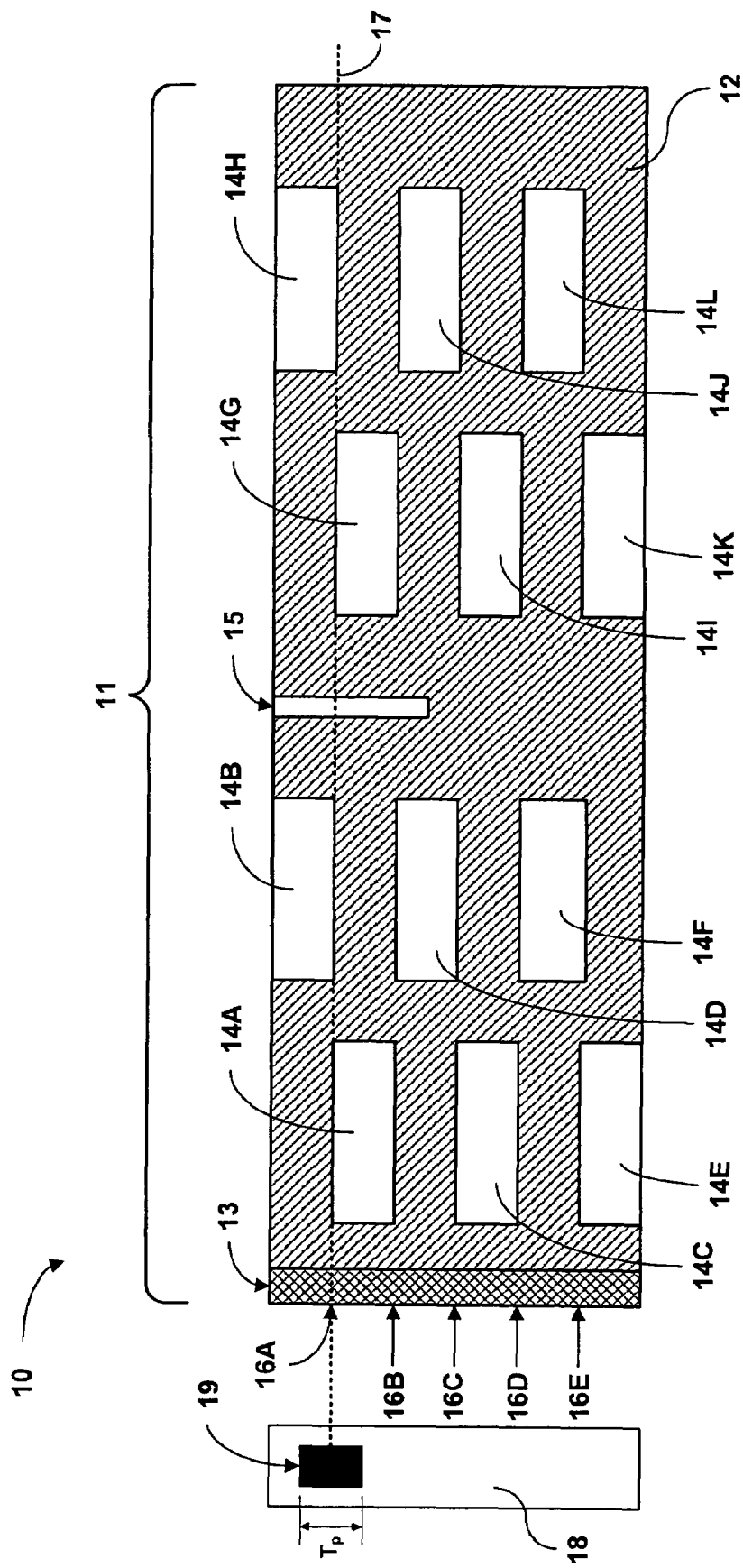
FIG. 1 is a depiction of a servo band portion of a prior art magnetic tape relative to a servo read device including a servo read head.

FIG. 1 is a depiction of a servo band portion of a prior art magnetic tape 10 relative to a servo read device 18 including a servo read head 19. Magnetic tape 10 is recorded with a conventional amplitude-based servo pattern. The conventional servo pattern illustrated in FIG. 1 includes a number of servo windows 14A-14L ("servo windows 14") arranged in a checkerboard-like pattern. Servo windows 14 may comprise areas where a previously recorded magnetic signal 12 has been erased from magnetic tape 10. Erased servo windows 14A-14L reside in a servo frame 11 of magnetic tape 10.

In the illustrated embodiment, magnetic tape 10 includes five servo tracks 16A-16E ("servo tracks 16"). Servo tracks 16 define centerlines, for example, servo track 16A defines centerline 17. Servo tracks 16 collectively define a servo band. In general, a servo band is defined as a collection of a plurality of servo tracks. Thus, a servo band could include any number of servo tracks. Each of servo tracks 16 may reside a known distance from a corresponding data track or set of data tracks (not shown).

The servo pattern can be written by passing magnetic tape 10 under gaps of a servo write head (not shown). A relatively wide gap in the servo head can be used to record magnetic signal 12 having a first frequency on the surface of magnetic tape 10. Moreover, a magnetic signal having a second frequency may define a transition region 13 to indicate the beginning of servo frame 11. To record transition region 13, the frequency of the written signal is changed for a short period of time while the tape passes under the wide gap in the servo head. The transition region 13 serves as synchronization mark in the prior art servo detection scheme.

A servo write head (or a separate erase head) having a relatively small write gap track width in the direction transverse to the servo track direction can be used to create erased servo windows 14. For example, erased servo windows 14 may form a checkerboard-like configuration that enables servo read head 19 to pinpoint track locations. In accordance with the prior art, the erased servo windows 14 respectively positioned above and below centerline 17 have a common width.

In operation, as magnetic tape 10 passes by servo read head 19 positioned over a first track 16A, the magnetic signal detected by read head 19 can identify the location of servo head 19 relative to centerline 17. For example, as servo head 19 moves partially over servo window 14A along centerline 17, the detected signal amplitude should reduce by 50 percent if servo head 19 is precisely on-track. The detected signal is 100 percent when servo head 19 is not passing over one of servo windows 14, but reduces when servo head 19 passes partially over one of servo windows 14 because the part of servo head 19 passing over the servo window is not exposed to a signal. If the detected signal amplitude falls by an amount greater or less than 50 percent as servo head 19 passes partially over servo window 14A along centerline 17, then servo read device 18 can be moved to better position servo read head 19 over centerline 17. In this manner, centerline 17 of servo track 16A can be located. Corresponding data tracks (not shown) are located at defined displacements from centerline 17 of servo track 16. Similarly, the centerlines of servo tracks 16B-16E can be defined by the various erased servo windows relative to magnetic pattern 12.

Magnetic tape 10 may also include a track identification mark 15. Track identification mark 15 allows a servo controller to distinguish track 16A from tracks 16C and 16E.

Without track identification mark 15 on magnetic tape 10, the detected signals associated with tracks 16A, 16C and 16E are generally indistinguishable. For example, track identification mark 15 may comprise a magnetic signal having a different discernable frequency than signal 12. Track identification mark 15 is conventionally shaped differently than servo windows 14. Also, unlike servo windows 14, track identification mark 15 is not positioned or used for amplitude-based servo positioning. For example, track identification mark 15 typically crosses one or more centerlines 17. Adjacent servo bands may include a track identification mark similar to mark 15, but positioned differently within the given band, so that tracks 16C, 16D and 16E can be identified.

Figure 2:
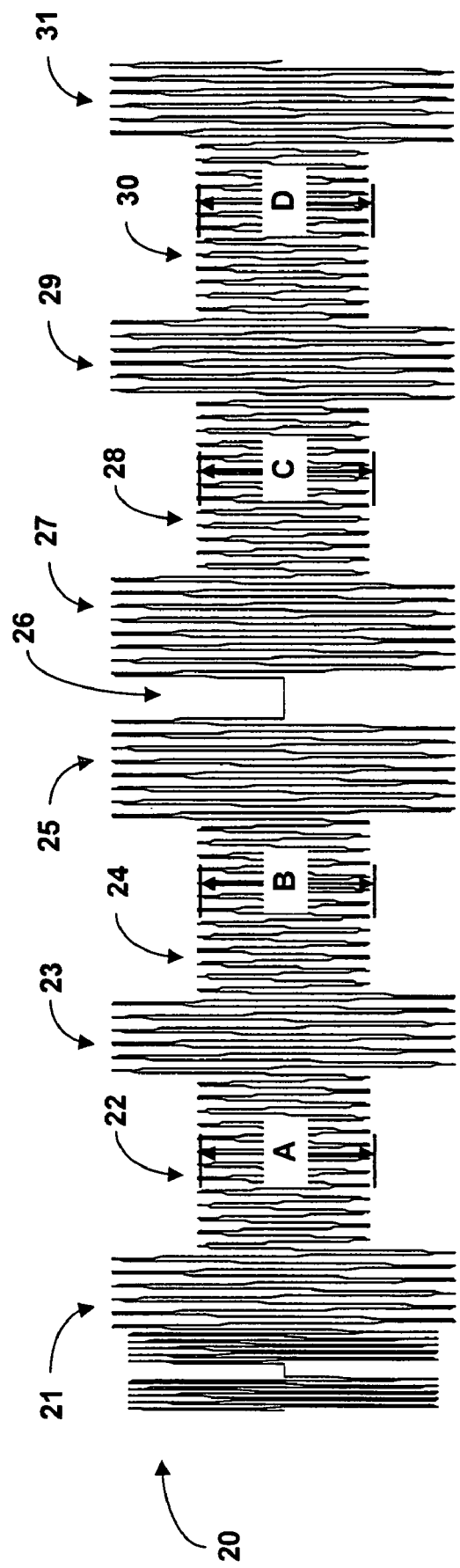
FIG. 2 illustrates an exemplary output signal corresponding to FIG. 1.

FIG. 2 illustrates an exemplary output signal corresponding to FIG. 1. In particular, FIG. 2 illustrates output servo signal 20 associated with servo read head 19 passing over servo track 16A along centerline 17. In general, variations in the amplitude of signal 20 can be used to identify whether servo head 19 is on-track. A servo controller coupled to servo read device 18 may generate a position error signal (PES) based on the amplitude variations of servo signal 20 and move servo read device 18 to properly align servo read head 19 with servo track 16A.

As servo head 19 passes along centerline 17, servo carrier signal 12 provides a full amplitude response in signal 20 at locations 21, 23, 25, 27, 29 and 31. The amplitude of signal 20 falls by 100 percent at location 26 corresponding to track identification mark 15. The amplitude of servo signal 20 reduces to an amplitude (A) at location 22 corresponding to servo head 19 passing partially over erased servo window 14A. The amplitude of servo signal 20 reduces to an amplitude (B) at location 24 corresponding to servo head 19 passing partially over erased servo window 14B.

Amplitudes A and B indicate the position of servo head 19 relative to centerline 17. For example, a fall in the amplitude of signal 20 by approximately 50 percent at both locations 22 and 24 would indicate on-track positioning of servo head 19, as shown in FIG. 2. As an example, if amplitude A was larger than amplitude B, servo head 19 may be positioned slightly above centerline 17. A first PES ($PES_1$) may be calculated from signal 20 based on a track pitch ($T_p$) of servo read head 19 and amplitudes A and B.

$$PES_1 = \left(\frac{T_p}{2}\right)\left(\frac{A-B}{A+B}\right) \quad (1)$$

The first PES provides positioning information relative to centerline 17 that may cause movement of servo head 19 to positions that ensure amplitudes A and B correspond to 50 percent falls in the amplitude of signal 20, which indicates on-track positioning.

In some cases, the servo controller may use only the first PES to position servo head 19 adjacent servo track 16A. However, there is no redundancy in the first PES which only includes servo signals from servo windows 14A and 14B along servo track 16A. The lack of redundancy may allow dropout errors in servo signal 20 to go unnoticed. For example, debris or defects on magnetic tape 10 or servo read head 19 may cause a signal dropout in servo signal 20, which the servo controller may view as another erased servo window. With no PES redundancy, the error cannot be detected or corrected and may lead to inaccurate positioning of servo read head 19 relative to servo track 16A, and in turn inaccurate positioning of a data read head relative to a corresponding data track.

In order to provide PES redundancy, a second PES is calculated based on servo signals from servo windows 14G and 14H along servo track 16A. As illustrated in FIG. 2, the amplitude of servo signal 20 reduces to an amplitude (C) at location 28 corresponding to servo head 19 passing partially over erased servo window 14G. The amplitude of servo signal 20 reduces to an amplitude (D) at location 30 corresponding to servo head 19 passing partially over erased servo window 14H.

Amplitudes C and D indicate the position of servo head 19 relative to centerline 17. For example, a fall in the amplitude of signal 20 by approximately 50 percent at both locations 28 and 30 would indicate on-track positioning of servo head 19, as shown in FIG. 2. As an example, if amplitude C was larger than amplitude D, servo head 19 may be positioned slightly above centerline 17. A second PES ($PES_2$) may be calculated from signal 20 based on a track pitch ($T_p$) of servo read head 19 and amplitudes C and D.

$$PES_2 = \left(\frac{T_p}{2}\right)\left(\frac{C-D}{C+D}\right) \quad (2)$$

The second PES provides positioning information relative to centerline 17 that may cause movement of servo head 19 to a position that ensures amplitudes C and D correspond to 50 percent falls in the amplitude of signal 20, which indicates on-track positioning. In other embodiments, PES redundancy may be achieved across the magnetic tape using additional servo read heads and servo bands. Calculating an overall PES by averaging the first PES and the second PES reduces influence of dropout or other signal errors in servo signal 20.

As track pitches decrease in amplitude-based servo patterns, the assembly of a servo write head becomes more complicated due to multi-bump gap alignments needed to make the pattern. When a servo read head reads the servo pattern, the effective dynamic range and linearity of the playback servo signal are affected by the SNR within the erase windows, and the erase current errors between each erase gap on the servo write head.

The invention is directed to data storage medium comprising a servo frame that includes servo windows written with different frequencies to provide redundant PES. The servo frame includes a set of first servo windows recorded at a first frequency and a set of second servo windows recorded at a second frequency arranged in a checkerboard-like pattern. The different frequencies of the servo windows allow the servo frame to achieve PES redundancy. A servo track may include a plurality of the servo frames described herein to accurately position data read/write heads adjacent corresponding data tracks. The PES redundancy built into each of the servo frames substantially minimizes errors in the overall PES. The servo pattern also generates a full amplitude mixed frequency servo signal that substantially improves the SNR. Furthermore, a single or double bump servo write head with adjacent writer gaps may write the simple checkerboard-like pattern, eliminating the need for complex servo write head assemblies.

Figure 3:
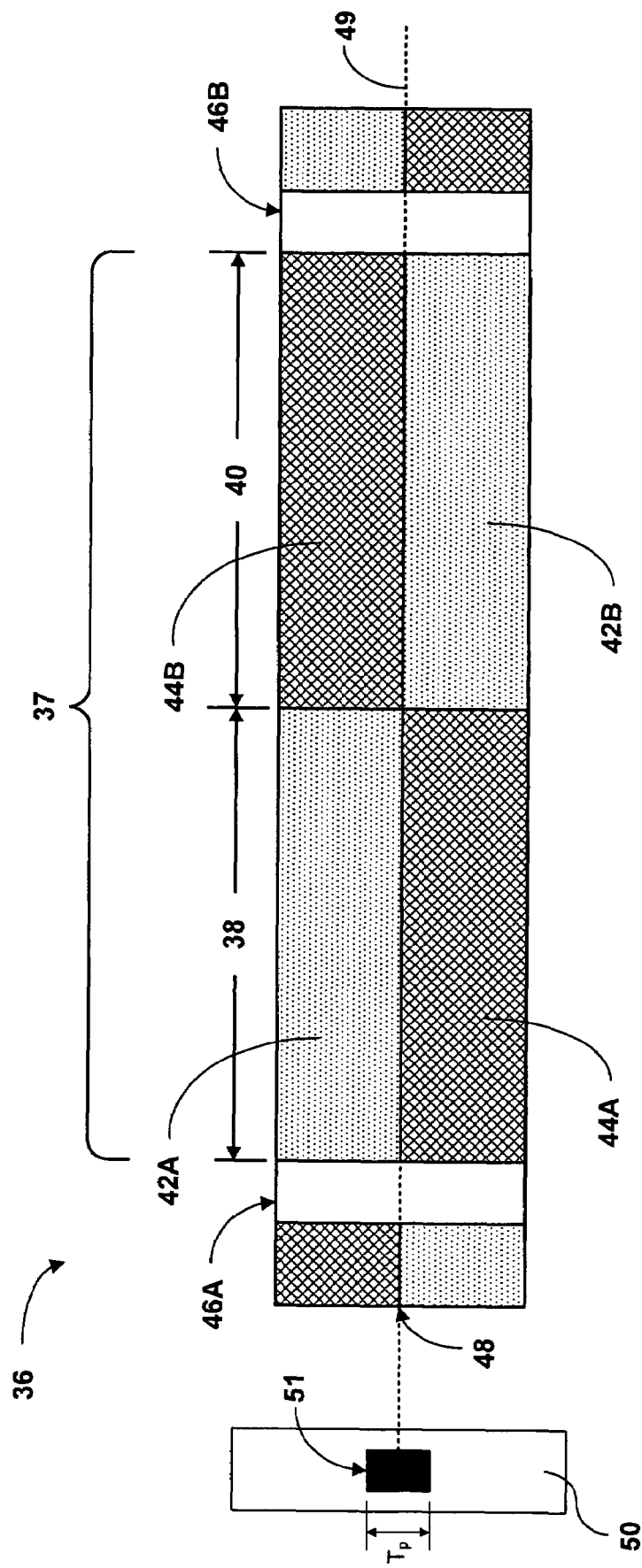
FIG. 3 is a depiction of a servo track portion of a magnetic tape relative to a servo read device including a servo read head.

FIG. 3 is a depiction of a servo track portion of a magnetic tape 36 relative to a servo read device 50 including a servo read head 51. Magnetic tape 36 includes a servo frame 37 recorded with a mixed-frequency, amplitude-based servo pattern. The servo pattern illustrated in FIG. 3 includes a set of first servo windows recorded at a first frequency 42A and 42B ("first servo windows 42") and a set of second servo windows recorded at a second frequency 44A and 44B ("second servo windows 44"). The set of first servo windows 42 and the set of second servo windows 44 are arranged in a checkerboard-like pattern. The different frequencies of the servo windows 42, 44 in servo frame 37 provide built-in PES redundancy.

In the illustrated embodiment, magnetic tape 36 includes only one servo track 48 that defines a centerline 49. Servo frame 37 includes a first portion 38 and a second portion 40. Within first portion 38 of servo frame 37, first servo window 42A is positioned above centerline 49 and second servo window 44A is positioned below centerline 49. Within second portion 40 of servo frame 37, first servo window 42B is positioned below centerline 49 and second servo window 44B is positioned above centerline 49. Servo track 48 resides a known distance from one or more data tracks (not shown). In other words, a number of data tracks may be defined with respect to servo track 48. In other embodiments, magnetic tape 36 may include any number of servo tracks that collectively define a servo band.

Servo track 48 includes a plurality of servo frames (not shown) separated by synchronization (sync) regions. As shown in FIG. 3, sync regions 46A and 46B ("sync regions 46") separate servo frame 37 from other servo frames along servo track 48. Servo track 48 includes sync region 46A before servo frame 37 to indicate a beginning of servo frame 37. Sync regions 46 may comprise erased windows, unrecorded windows, or windows recorded at a third frequency. In some cases, the different widths of sync windows 46 can be varied to encode a digital word over the plurality of servo frames. For example, sync windows 46 may encode linear positioning (LPOS) information of magnetic tape 36.

The servo pattern can be written by passing magnetic tape 36 under gaps of a servo write head (not shown). A single or two bump servo write head with adjacent writer gaps can be used to record first servo windows 42 at the first frequency and second servo windows 44 at the second frequency. Therefore, the servo pattern described herein can easily be written in a drive since it does not require a complex head configuration. First and second servo windows 42 and 44 may form a checkerboard-like configuration that enables servo read head 51 to pinpoint the location of track 48. In accordance with the invention, the first and second servo windows 42 and 44 positioned above and below centerline 49 have a common width. The first frequency and the second frequency may be substantially different and may be selected to not have common harmonics. For example, the first frequency may be approximately 1.2 MHz and the second frequency may be approximately 2.0 MHz.

In operation, as magnetic tape 36 passes by servo read head 51 positioned over servo track 48, the magnetic signal detected by servo head 51 can identify the location of servo head 51 relative to centerline 49. As servo head 51 moves over the set of first servo windows 42 and the set of second servo windows 44 along centerline 49, servo read head 51 detects a mixed frequency servo signal. The detected signal amplitude peaks remain at 100 percent regardless of the position of servo head 51 relative to centerline 49. The detected mixed frequency servo signal is filtered to generate a first frequency servo signal and a second frequency servo signal. Variations in the first frequency servo signal and the second frequency servo signal identify the location of servo head 51 relative to centerline 49.

When the mixed frequency servo signal is constant and does not contain signal dropouts, both the first PES and the second PES adjust positioning of a servo read head 51 in the same direction. In other words, the two position error signals will generate redundant positioning information for the servo head 51. In the case where the mixed frequency servo signal does includes signal dropouts, the first PES and the second PES diverge, but their magnitudes are equal such that the dropout does not affect an average of the position error signals.

If the amplitude of the first frequency servo signal is not approximately equal to the amplitude of the second frequency servo signal, then servo read device 50 can be moved to better position servo read head 51 over centerline 49. In this manner, centerline 49 of servo track 48 can be located. Corresponding data tracks (not shown) are located at defined displacements from centerline 49 of servo track 48.

In embodiments where magnetic tape 36 includes more than one servo track, magnetic tape 36 may also include track identification marks. The track identification marks may be substantially similar to track identification mark 15 from FIG. 1. The track identification marks allow a servo controller to distinguish a given track from the other tracks within the servo band.

Figure 4:
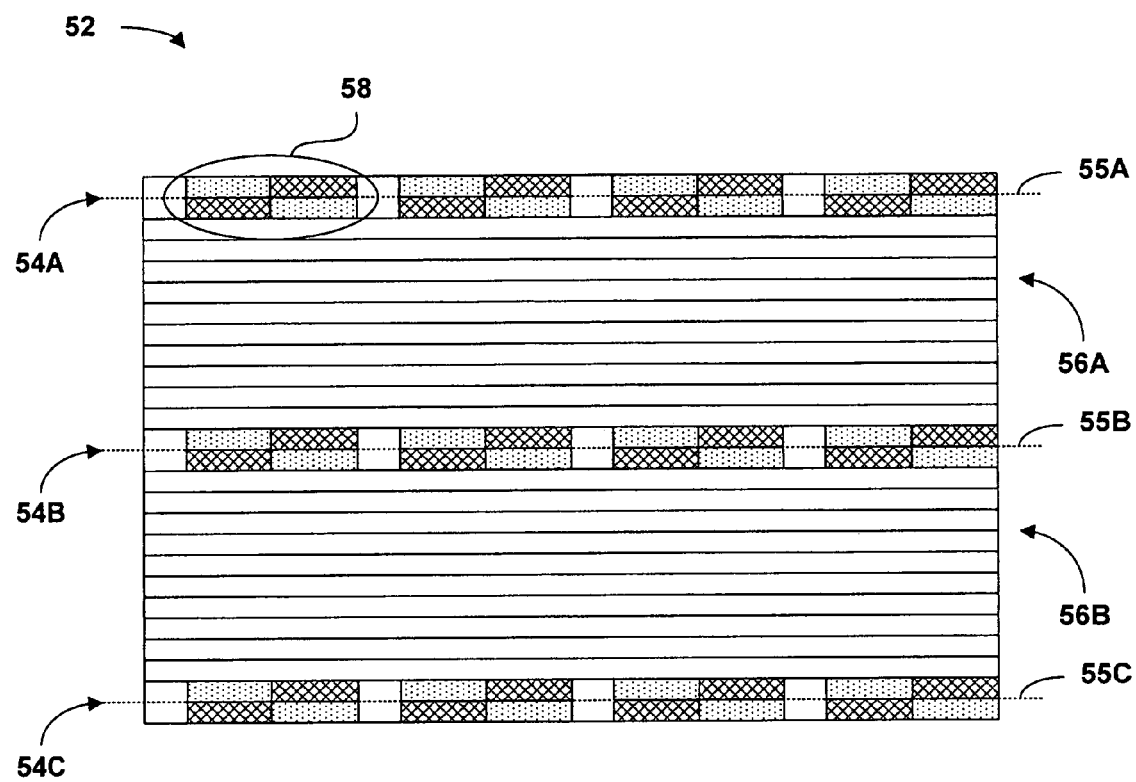
FIG. 4 is a depiction of a magnetic tape according to an embodiment of the invention.

FIG. 4 is a depiction of a magnetic tape 52 according to an embodiment of the invention. Magnetic tape 52 includes servo tracks 54A-54C ("servo tracks 54") and data bands 56A and 56B ("data bands 56"). Servo tracks 54 are substantially similar to servo track 48 on magnetic tape 36 as illustrated in FIG. 3. Data bands 56A, 56B are respectively positioned between the different servo tracks 54. Each of data bands 56 defines a plurality of data tracks. For example, 32 or more data tracks may reside between successive servo tracks. In other embodiments, magnetic tape 52 may comprise a plurality of servo tracks positioned adjacent one another to define at least one servo band.

Sets of mixed frequency, amplitude-based servo windows 58 are arranged with respect to centerlines 55A-55C ("centerlines 55") with individual servo windows typically being adjacent one or more centerlines 55. As illustrated, the sets of mixed frequency servo windows 58 repeat to define successive servo frames along the length of magnetic tape 52.

In the example of FIG. 4, the set of mixed frequency, amplitude-based servo windows 58 is arranged in a checkerboard-like configuration. The set of mixed-frequency, amplitude-based servo windows 58 may be arranged similarly to conventional amplitude-based servo patterns. However, the set of mixed frequency servo windows 58 includes a set of first servo windows recorded at a first frequency and a set of second servo windows recorded at a second frequency. The different frequencies provide PES redundancy within a single frame length to substantially minimize positioning information errors. In addition, the full amplitude output improves the SNR of the servo signal.

Figure 5A:
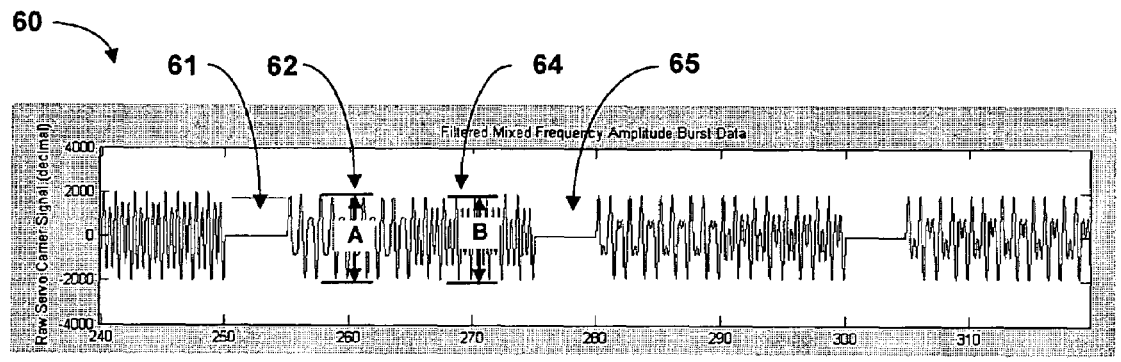
FIGS. 5A-5C illustrate exemplary output signals corresponding to FIG. 3.
Figure 5B:
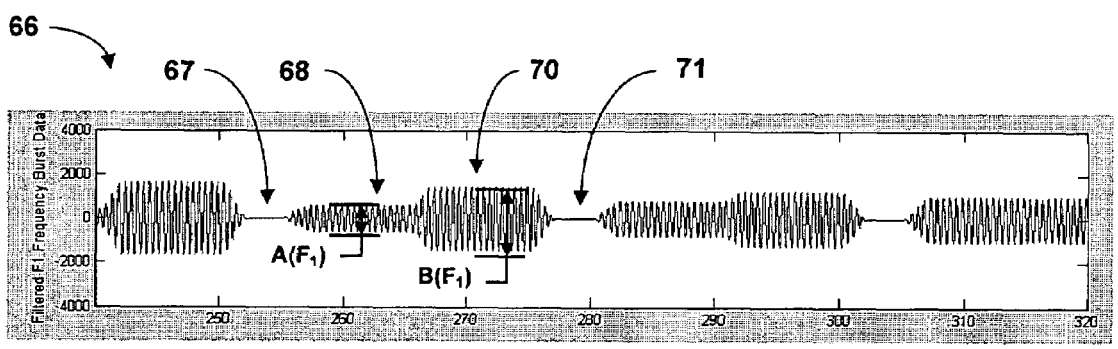
Figure 5C:
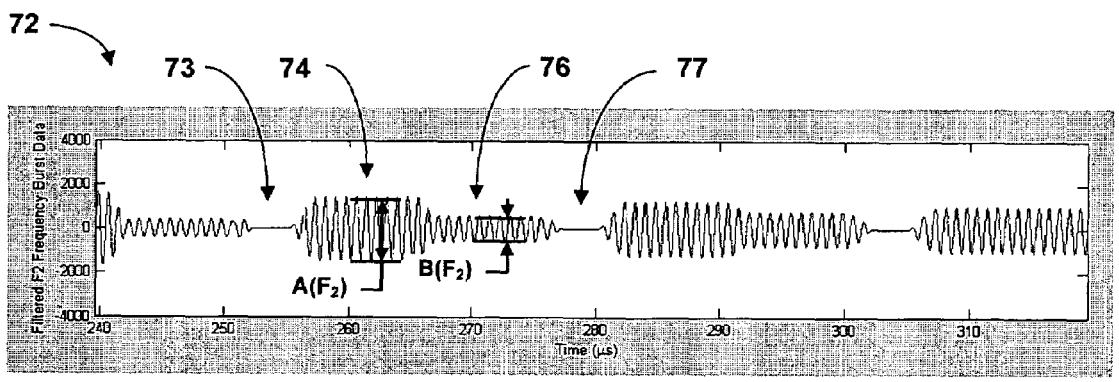

FIGS. 5A-5C illustrate exemplary output signals corresponding to FIG. 3. In particular, FIG. 5A illustrates mixed frequency servo signal 60 associated with servo read head 51 passing over servo track 48 along centerline 49. FIG. 5B illustrates first frequency servo signal 66 generated by filtering the first frequency from mixed frequency servo signal 60. FIG. 5C illustrates second frequency servo signal 72 generated by filtering the second frequency from mixed frequency servo signal 60. First frequency servo signal 66 and second frequency servo signal 72 extracted from mixed frequency servo signal 60 provide PES redundancy.

In general, variations in the amplitude of first frequency servo signal 66 and second frequency servo signal 72 can be used to identify whether servo head 51 is on-track. A servo controller coupled to servo read device 50 may generate an overall PES based on the amplitude variations of first frequency servo signal 66 and second frequency servo signal 72 and move servo read device 50 to properly align servo read head 51 with servo track 48.

As servo head 51 passes along centerline 49, the set of first servo windows 42 and the set of second servo windows 44 always provide a full amplitude response in signal 60, shown in FIG. 5A. Mixed frequency servo signal 60 includes a first burst 62 that corresponds to first portion 38 of servo frame 37 and a second burst 64 that corresponds to second portion 40 of servo frame 37. The amplitude of signal 60 falls by 100 percent at locations 61 and 65 corresponding to sync regions 46A and 46B. The reduced amplitude indicates a beginning of a servo frame to the servo controller.

As described above, first burst 62 (A) corresponds to first region 38 of servo frame 37 in which first servo window 42A is positioned above centerline 49 and second servo window 44A is positioned below centerline 49. Second burst 64 (B) corresponds to second region 40 of servo frame 37 in which first servo window 42B is positioned below centerline 49 and second servo window 44B is positioned above centerline 49.

The servo controller filters the first frequency from mixed frequency servo signal 60 and generates first frequency servo signal 66. The servo controller includes a first filter tuned to substantially eliminate the second frequency from the mixed frequency servo signal 60. In some cases, the first filter is tuned to have a peak at the first frequency and to have a null at the second frequency. In this way, first frequency servo signal 66 includes only signals generated from the set of first servo windows 42.

As shown in FIG. 5B, the amplitude of first frequency servo signal 66 reduces to an amplitude ($A(F_1)$) at location 68 corresponding to servo head 51 passing partially over first servo window 42A in first portion 38 of servo frame 37. The amplitude of first frequency servo signal 66 reduces to an amplitude ($B(F_1)$) at location 70 corresponding to servo head 51 passing partially over first servo window 42B in second portion 40 of servo frame 37. The amplitude of signal 66 falls by 100 percent at locations 67 and 71 corresponding to sync regions 46A and 46B. When servo head 51 passes over sync region 46, servo head 51 detects a synchronization signal that indicates a beginning of a servo frame.

Amplitudes $A(F_1)$ and $B(F_1)$ indicate the position of servo head 51 relative to centerline 49. For example, a fall in the amplitude of signal 66 that is approximately equal at both locations 68 and 70 would indicate on-track positioning of servo head 51. If amplitude $A(F_1)$ was smaller than amplitude $B(F_1)$, as shown in FIG. 4B, servo head 51 may be positioned slightly below centerline 49. A first PES ($PES_1$) may be calculated from first frequency servo signal 66 based on a track pitch ($T_p$) of servo read head 51 and amplitudes $A(F_1)$ and $B(F_1)$.

$$PES_1 = \left(\frac{A(F_1) - B(F_1)}{A(F_1) + B(F_1)}\right)\frac{T_P}{2} \quad (3)$$

The first PES provides positioning information relative to centerline 49 that may cause movement of servo head 51 to positions that ensure amplitudes $A(F_1)$ and $B(F_1)$ correspond to approximately equal falls in the amplitude of signal 66, which indicates on-track positioning.

The servo controller also filters the second frequency from mixed frequency servo signal 60 and generates second frequency servo signal 72. The servo controller includes a second filter tuned to substantially eliminate the first frequency from the mixed frequency servo signal 60. In some cases, the second filter is tuned to have a peak at the second frequency and to have a null at the first frequency. In this way, second frequency servo signal 72 includes only signals generated from the set of second servo windows 44.

As shown in FIG. 5C, the amplitude of second frequency servo signal 72 reduces to an amplitude ($A(F_2)$) at location 74 corresponding to servo head 51 passing partially over second servo window 44A in first portion 38 of servo frame 37. The amplitude of second frequency servo signal 72 reduces to an amplitude ($B(F_2)$) at location 76 corresponding to servo head 51 passing partially over second servo window 44B in second portion 40 of servo frame 37. The amplitude of signal 72 falls by 100 percent at locations 73 and 77 corresponding to sync regions 46A and 46B.

Amplitudes $A(F_2)$ and $B(F_2)$ indicate the position of servo head 51 relative to centerline 49. For example, a fall in the amplitude of signal 72 that is approximately equal at both locations 74 and 76 would indicate on-track positioning of servo head 51. If amplitude $A(F_2)$ was larger than amplitude $B(F_2)$, as shown in FIG. 4C, servo head 51 may be positioned slightly below centerline 49. A second PES ($PES_2$) may be calculated from second frequency servo signal 72 based on a track pitch ($T_p$) of servo read head 51 and amplitudes $A(F_2)$ and $B(F_2)$.

$$PES_2 = -\left(\frac{A(F_2) - B(F_2)}{A(F_2) + B(F_2)}\right)\frac{T_P}{2} \quad (4)$$

The second PES provides positioning information relative to centerline 49 that may cause movement of servo head 51 to positions that ensure amplitudes $A(F_2)$ and $B(F_2)$ correspond to approximately equal falls in the amplitude of signal 72, which indicates on-track positioning. The second PES is 180 degrees complementary to the first PES given in equation (3).

When the mixed frequency servo signal is constant, as shown in FIG. 5A, both the first PES and the second PES adjust positioning of a servo read head 51 in the same direction. In other words, when the mixed frequency servo signal does not contain signal dropouts, the two position error signals will generate redundant positioning information for the servo head 51. In the case where the mixed frequency servo signal does includes signal dropouts, the first PES and the second PES diverge, but their magnitudes are equal such that the dropout does not affect an average of the position error signals.

The first PES and the second PES are averaged to calculate an overall PES. Averaging the out-of-phase position error signals substantially minimizes error. Dropout or other signal errors in mixed frequency servo signal 60 are substantially eliminated in the overall PES. Since servo signal 60 comprises a full amplitude signal, a dropout error cannot be assumed to be part of the output servo signal. For example, a dropout error may cause a loss of signal in first frequency servo signal 66 and a commensurate loss of signal in second frequency servo signal 72. When the first and second position error signals are averaged, the dropout error is minimized such that an overall PES may be calculated even though a portion of servo signal 60 is lost. In addition, the full amplitude mixed frequency servo signal improves SNR. Combining an anti-aliasing filter and band-pass filters provides good noise reduction for evaluating the burst fields of the mixed frequency servo signal.

In some conventional servo patterns, a single tone frequency may be written with a similar servo write head configuration and have un-erased windows. However, in the areas where the single tone frequency is written across the servo track, aligning the carrier phase between the two writer gaps may be very difficult. Misalignment of the phases can cause signal cancellations, addition of the resulting carrier signal, or amplitude modulation (AM). When accounting for other disturbances, such as speed jitter, these affects may be especially pronounced. By writing different frequencies, as described herein, the carrier phases are of no importance.

Figure 6:
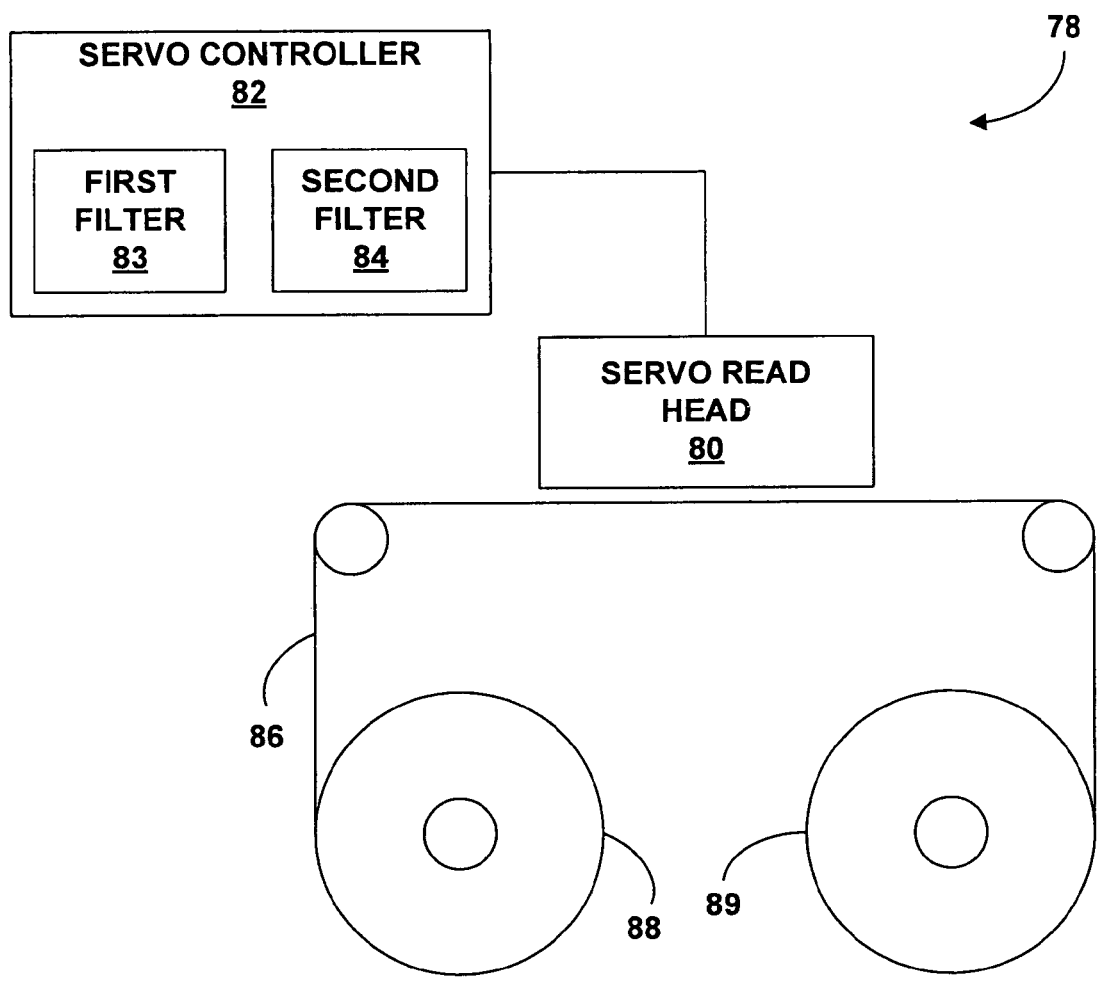
FIG. 6 illustrates an exemplary system for reading servo tracks recorded on a magnetic tape.

FIG. 6 illustrates an exemplary system 78 for reading servo tracks recorded on a magnetic tape 86. The servo tracks include servo frames written with a set of first servo windows recorded at a first frequency and a set of second servo windows recorded at a second frequency arranged in a checkerboard-like pattern, as described herein. For example, magnetic tape may include a servo track substantially similar to servo track 48 of magnetic tape 36 (FIG. 3). System 78 includes a servo read head 80 and a servo controller 82 coupled to servo read head 80. Servo read head 80 is positioned proximate magnetic tape 86, which is spooled on spools 88 and 89. In the illustrated embodiment, system 78 comprises a magnetic tape drive. One or both of spools 88 and 89 may reside in a data storage cartridge that stores magnetic tape 86.

Magnetic tape 86 feeds from spool 88 to spool 89, passing in close proximity to servo read head 80. As magnetic tape 86 passes over servo read head 80, servo read head 80 detects a mixed frequency servo signal from servo tracks recorded on magnetic tape 86. Servo controller 82 receives the mixed frequency servo signal from servo read head 80. Servo controller 82 includes a first filter 83 capable of filtering the first frequency from the mixed frequency servo signal. Servo controller 82 also includes a second filter 84 capable of filtering the second frequency from the mixed frequency servo signal.

Figure 7:
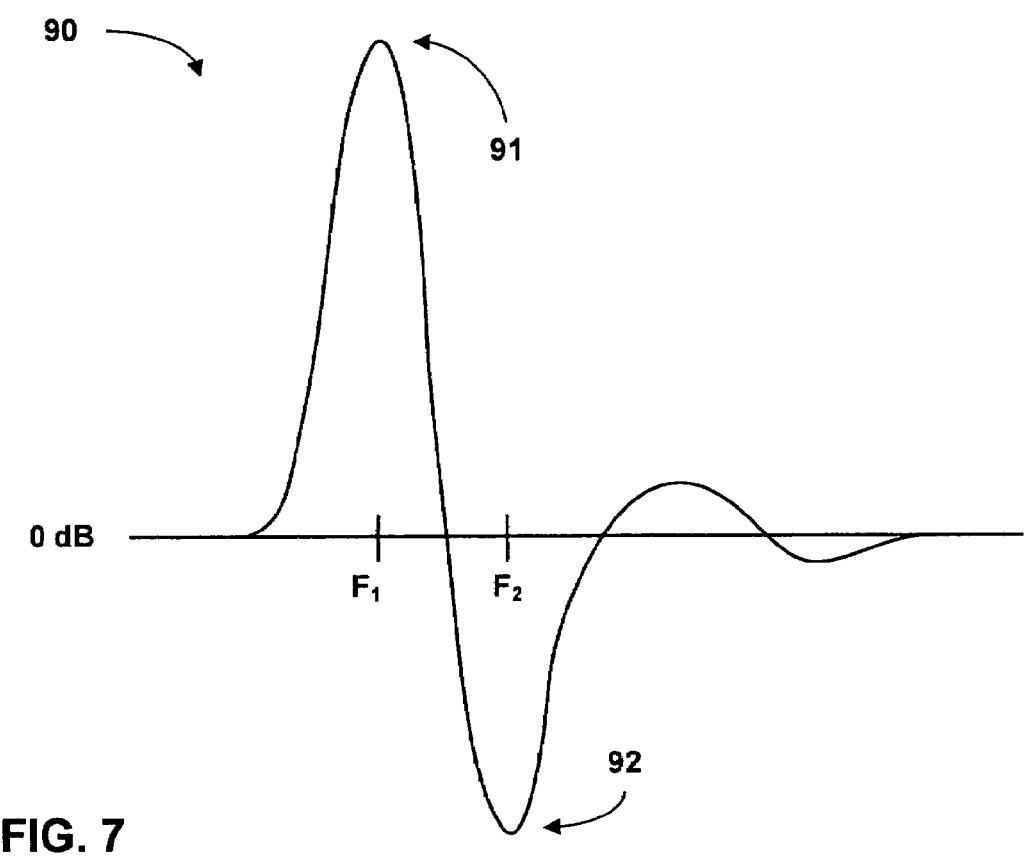
FIG. 7 illustrates a plot of an exemplary response of a first filter.

FIG. 7 illustrates a plot 90 of an exemplary response of first filter 83. Plot 90 includes a peak 91 at the first frequency ($F_1$) and a null 92 at the second frequency ($F_2$). For example, the first frequency may be approximately 1.2 MHz and the second frequency may be approximately 2.0 MHz. In any case, the first and second frequencies are substantially different from one another such that they do not have any common harmonics. First filter 83 may be specially tuned to substantially eliminate the second frequency from the mixed frequency servo signal received from servo read head 80.

Figure 8:
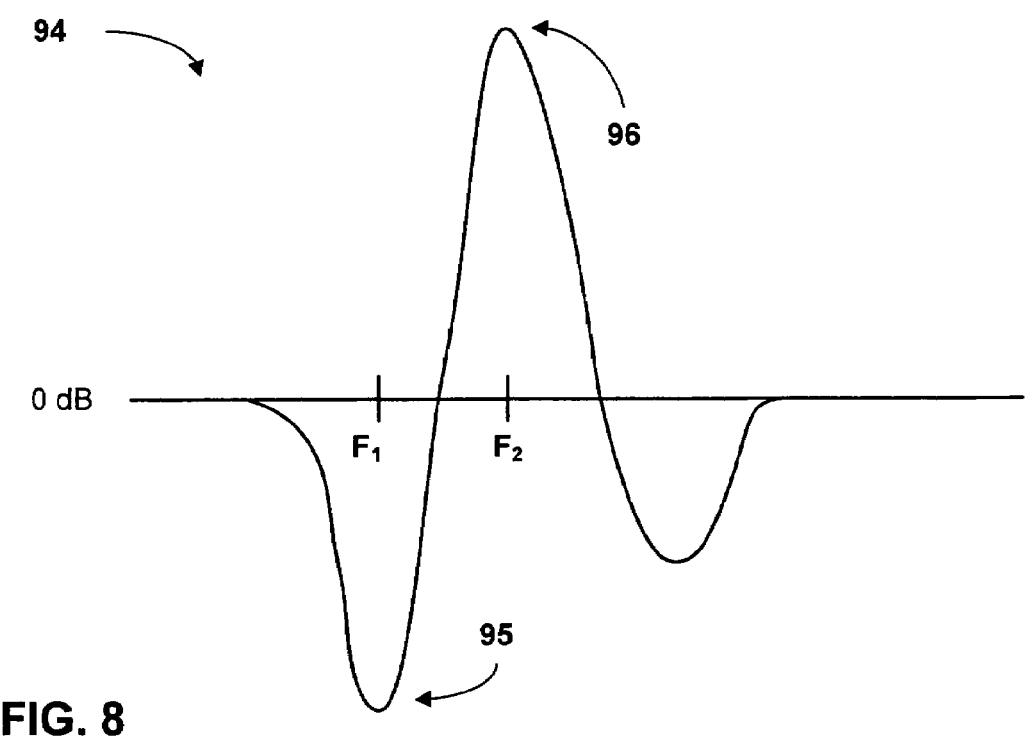
FIG. 8 illustrates a plot of an exemplary response of a second filter.

FIG. 8 illustrates a plot 94 of an exemplary response of second filter 84. Plot 94 includes a null 95 at the first frequency ($F_1$) and a peak 96 at the second frequency ($F_2$). Second filter 84 may be specially tuned to substantially eliminate the first frequency from the mixed frequency servo signal received from servo read head 80

With further reference to FIG. 6, servo controller 82 applies first filter 83 to the mixed frequency servo signal and generates a first frequency servo signal based on the output of first filter 83. Servo controller 82 also applies second filter 84 to the mixed frequency servo signal and generates a second frequency servo signal based on the output of second filter 84. Servo controller 82 then calculates a first PES based on the first frequency servo signal and calculates a second PES based on the second frequency servo signal. Servo controller 82 calculates an overall PES by averaging the first PES and the second PES.

Figure 9A:
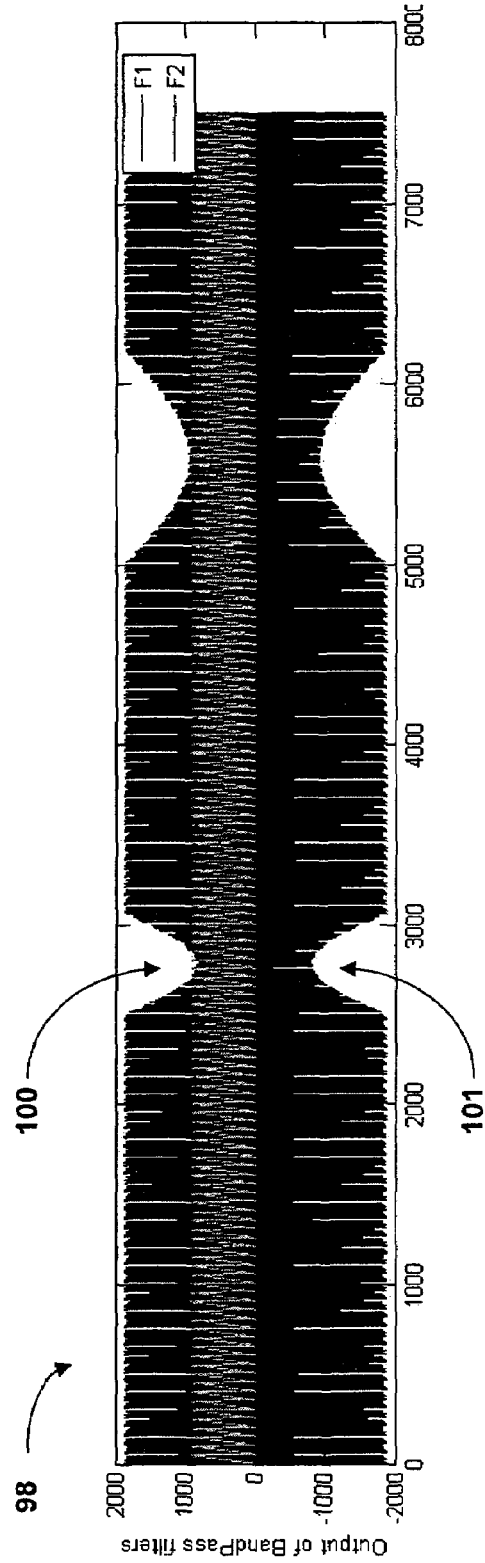
FIG. 9A illustrates a plot of an exemplary filtered mixed frequency servo signal with signal dropout.

FIG. 9A illustrates a plot 98 of an exemplary filtered mixed frequency servo signal with signal dropout. Plot 98 includes output from both a first frequency filter and a second frequency filter applied to a mixed frequency servo signal detected from a mixed frequency amplitude-based servo pattern. As described above, the first filter may be tuned to pass only the first frequency and to substantially eliminate the second frequency. The second filter may be tuned to pass only the second frequency and to substantially eliminate the first frequency. Plot 98 includes both the first frequency servo signal and a second frequency servo signal. As illustrated in FIG. 9A, a signal dropout in the detected mixed frequency servo signal creates signal dropouts 100 and 101 in the first and second frequency servo signals.

Figure 9B:
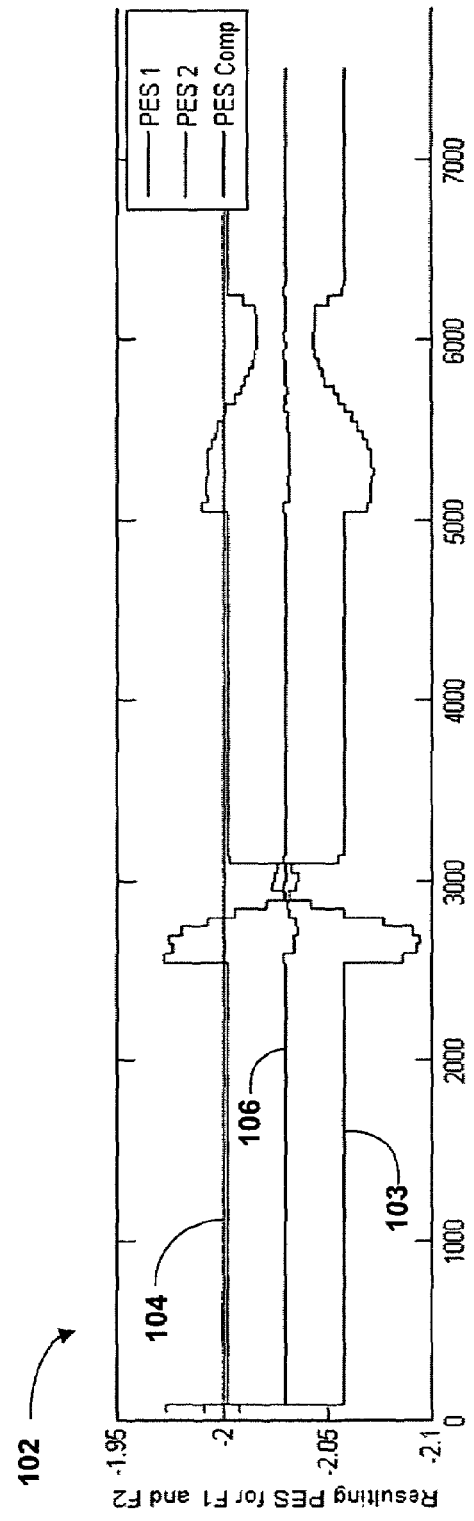
FIG. 9B illustrates a plot of exemplary position error signals calculated by a servo controller in the presence of signal dropout.

FIG. 9B illustrates a plot 102 of exemplary position error signals calculated by servo controller 82 in the presence of signal dropouts 100 and 101. Plot 102 includes a first PES 103, a second PES 104, and an overall PES 106. Servo controller 82 calculates first PES 103 from the first frequency servo signal using equation (3) given above. First PES 103 includes several variations which may be due to errors, such as dropout, in the mixed frequency servo signal. Servo controller 82 calculates second PES 104 from the second frequency servo signal using equation (4) given above. Second PES 104 is out of phase with first PES 103. As shown in FIG. 9B, the variations in second PES 104 are 180 degrees complementary to the variations in first PES 103. In other words, first PES 103 and second PES 104 diverge when a signal dropout is encountered.

Servo controller 82 averages first PES 103 and second PES 104 to calculate overall PES 106. First PES 103 and second PES 104 maintain equal magnitudes when they diverge due to signal dropouts 100 and 101. Therefore, overall PES 106 includes only minor variations relative to first PES 103 and second PES 104. As described above, averaging the out-of-phase position error signals 103 and 104 substantially minimizes error in the mixed frequency servo signal. In other words, the variations in first PES 103 are cancelled out by the variations in second PES 104. In this way, providing a servo frame with built-in redundant PES improves accuracy of the overall PES, which in turn improves data readout from a magnetic tape.

Figure 10:
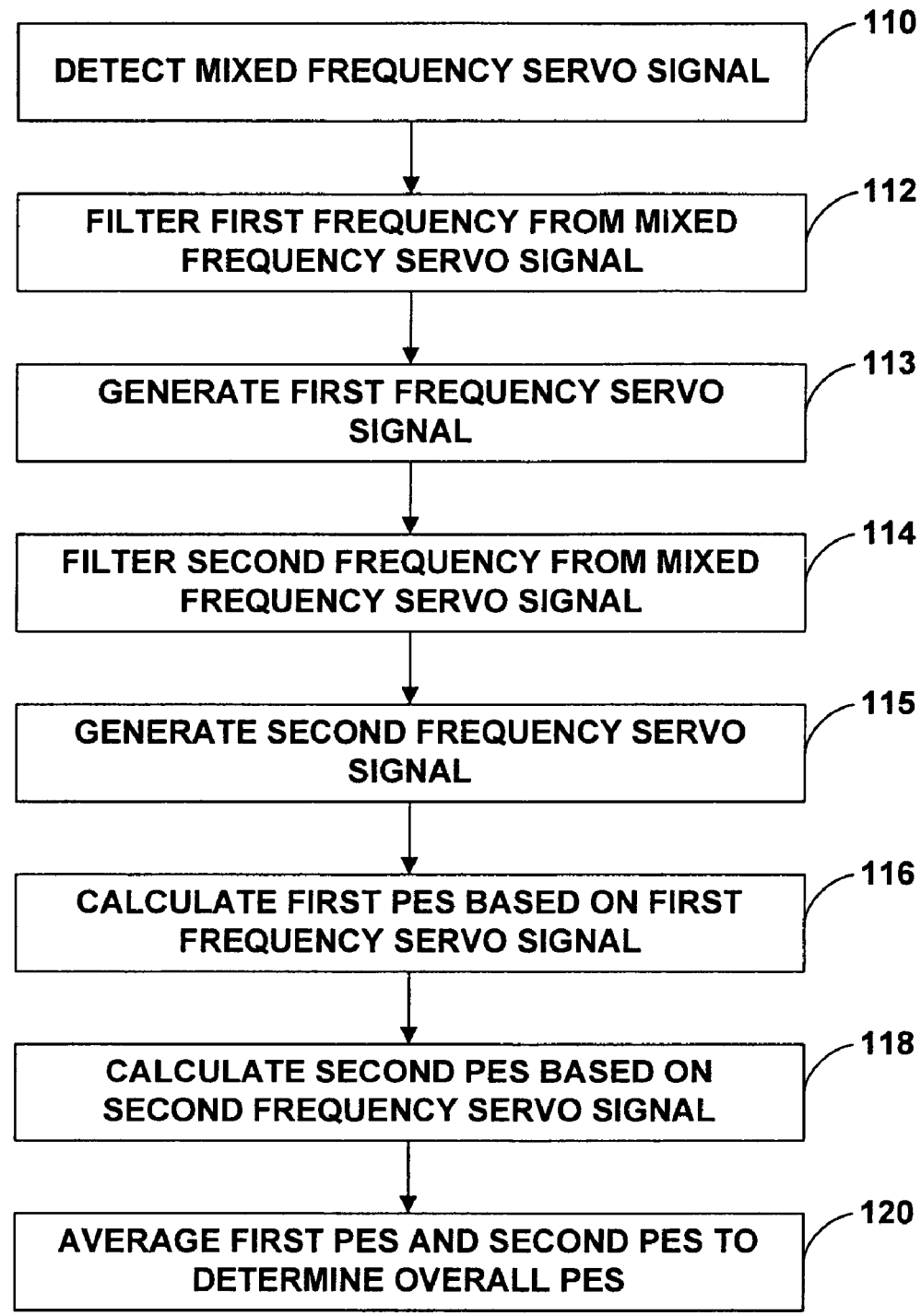
FIG. 10 is a flowchart illustrating a method for reading a servo track recorded on a magnetic tape.

FIG. 10 is a flowchart illustrating a method for reading a servo track recorded on a magnetic tape. The servo track includes servo frames written with a set of first servo windows recorded at a first frequency and a set of second servo windows recorded at a second frequency arranged in a checkerboard-like pattern. The method will be described in reference to servo read system 78 of FIG. 6. For example, the servo track may be recorded on magnetic tape 86.

Servo read head 80 is positioned proximate magnetic tape 86. As magnetic tape 86 passes over servo read head 80, servo read head 80 detects a mixed frequency servo signal from the servo track recorded on magnetic tape 86 (110). Servo controller 82 receives the mixed frequency servo signal from servo read head 80. The mixed-frequency servo signal comprises a full amplitude servo signal across the servo frame. The full amplitude signal substantially improves the SNR.

Servo controller 82 filters the first frequency from the mixed frequency servo signal using first filter 83 (112). Servo controller 82 then generates a first frequency servo signal based on the output of first filter 83 (113). Servo controller 82 also filters the second frequency from the mixed frequency servo signal using second filter 84 (114). Servo controller 82 then generates a second frequency servo signal based on the output of second filter 84 (115).

The two distant servo signals generated from the single servo frame provide PES redundancy without extending the servo frame length of extending the servo sampling period. Servo controller 82 calculates a first PES based on the first frequency servo signal (116). Servo controller 82 also calculates a second PES based on the second frequency servo signal (118). When the mixed frequency servo signal is constant, both the first PES and the second PES adjust positioning of servo read head 80 in the same direction. In other words, when the mixed frequency servo signal does not contain signal dropouts, the two position error signals will generate redundant positioning information for the servo head 80.

Servo controller 82 averages the first PES and the second PES to determine an overall PES (120). The first PES and the second PES comprise out-of-phase signals with equal magnitudes. Therefore, averaging the first PES and the second PES substantially eliminates any dropout or other errors caused by debris on either magnetic tape 83 or servo read head 80. In this way, accuracy of the overall PES is substantially improved.

Various embodiments of the invention have been described. For example, a servo track has been described that includes a plurality of servo frames comprising a set of first servo windows recorded at a first frequency and a set of second servo windows recorded at a second frequency and arranged in a checkerboard-like pattern. Furthermore, a system and a method for reading the servo track have been described that includes individually filtering a mixed frequency servo signal to generate a first frequency servo signal and a second frequency servo signal, and calculating a PES based on the first and second frequency servo signals. These and other embodiments are within the scope of the following claims.

The invention claimed is:

1. A method of reading a servo track, the servo track comprising a plurality of servo frames that include a set of first servo windows recorded at a first frequency and a set of second servo windows recorded at a second frequency, wherein the first and second servo windows are arranged in a checkerboard-like pattern, the method comprising:
   detecting a mixed frequency servo signal;
   filtering the first frequency from the mixed frequency servo signal to generate a first frequency servo signal;
   filtering the second frequency from the mixed frequency servo signal to generate a second frequency servo signal; and
   calculating a position error signal based on the first frequency servo signal and the second frequency servo signal, wherein, calculating the position error signal comprises calculating a first position error signal based on the first frequency servo signal, calculating a second position error signal based on the second frequency servo signal, and averaging the first position error signal and the second position error signal, wherein the first position error signal is 180 degrees complementary to the second position error signal.

2. The method of claim 1, wherein filtering the first frequency comprises applying a first filter to the mixed frequency servo signal, and wherein filtering the second frequency comprises applying a second filter S the mixed frequency servo signal.

3. The method of claim 1, further comprising calculating the first position error signal according to:

$$PES_1 = \left(\frac{A(F_1) - B(F_1)}{A(F_1) + B(F_1)}\right)\frac{T_p}{2},$$

wherein $A(F_1)$ is a first burst pattern of the first frequency servo signal, $B(F_1)$ is a second burst pattern of the first frequency servo signal, and $T_p$ is the servo track pitch.

4. The method of claim 1, further comprising calculating the second position error signal according to:

$$PES_2 = -\left(\frac{A(F_2) - B(F_2)}{A(F_2) + B(F_2)}\right)\frac{T_p}{2},$$

wherein $A(F_2)$ is a first burst pattern of the second frequency servo signal, $B(F_2)$ is a second burst pattern of the second frequency servo signal, and $T_p$ is the servo track pitch.

5. The method of claim 1, wherein the servo track includes a synchronization region before each of the plurality of servo frames, the method further comprising detecting a synchronization signal that indicates a beginning of a servo frame.

6. The method of claim 1, wherein the mixed frequency servo signal comprises a full amplitude servo signal that substantially improves the signal-to-noise ratio.

7. The method of claim 1, wherein the first position error signal and the second position error signal provide redundant positioning information.

8. The method of claim 1, wherein the first position error signal includes variations due to errors in the in the mixed frequency servo signal, and wherein the second position error signal includes variations tat are 180 degrees complementary to the variations in the first position error signal.

9. The method of claim 8, wherein averaging the first position error signal and the second position error signal substantially cancels out the variations included in the first and second position error signals.

10. A system comprising:
   a servo read head positioned to read a servo track of a data storage medium, the servo track comprising a plurality of servo frames that include a set of first servo windows recorded at a first frequency and a set of second servo windows recorded at a second frequency, the first and second servo windows arranged in a checkerboard-like pattern, wherein the servo read head detects a mixed frequency servo signal from the servo track; and
   a servo controller coupled to the servo read head, wherein the servo controller filters the first frequency from the mixed frequency servo signal to generate a first frequency servo signal, filters the second frequency from the mixed frequency servo signal to generate a second frequency servo signal, and calculates a position error signal based on the first frequency servo signal and the second frequency servo signal, wherein the servo controller calculates a first position error signal based on the first frequency servo signal, calculates a second position error signal based on rue second frequency servo signal, and averages the first position error signal and the second position error signal to calculate the position, error signal, wherein the first position error signal is 180 degrees complementary to the second position error signal.

11. The system of claim 10, wherein the servo controller includes a first filter to filter the first frequency from the mixed frequency servo signal and a second filter to filter the second frequency from the mixed frequency servo signal.

12. The system of claim 11, wherein the first filter includes a peak at the first frequency and a null at the second frequency, and wherein the second filter includes a peak at the second frequency and a null at the first frequency.

13. The system of claim 11, wherein the first filter substantially eliminates the second frequency from the mixed frequency servo signal, and wherein the second filter substantially eliminates the first frequency from the mixed frequency servo signal.

14. The system of claim 10, wherein the first position error signal and the second position error signal provide redundant positioning information.

15. The system of claim 10, wherein the first position error signal includes variations due to errors in the in the mixed frequency servo signal, and wherein the second position error signal includes variations that are 180 degrees complementary to the variations in the first position error signal.

16. The system of claim 15, wherein the servo controller averages the first position error signal and the second position error signal to substantially cancel out die variations included in the first and second position error signals.

\* \* \* \* \*

UNITED STATES PATENT AND TRADEMARK OFFICE
CERTIFICATE OF CORRECTION

PATENT NO. : 7,379,254 B2  Page 1 of 1
APPLICATION NO. : 11/171958
DATED : May 27, 2008
INVENTOR(S) : Denis J. Langlois and Douglas W. Johnson It is certified that error appears in the above-identified patent and that said Letters Patent is hereby corrected as shown below:

Column 13
    Line 53, "wherein, calculating" should read --wherein calculating--.
    Line 64, "filter S" should read --filter to--.

Column 14
    Line 32, "in the in the" should read --in the--.
    Line 34, "tat" should read --that--.
    Line 60, "rue" should read --the--.
    Line 63, "position, error signal" should read --position error signal--.

Column 15
    Line 2, "in the in the" should read --in the--.
    Line 9, "die" should read --the--.

Signed and Sealed this

Nineteenth Day of May, 2009

JOHN DOLL
*Acting Director of the United States Patent and Trademark Office*